UNITED STATES PATENT OFFICE.

FRANK HOWARD, OF SOMERVILLE, MASSACHUSETTS.

IMPROVEMENT IN BONNETS.

Specification forming part of Letters Patent No. 43,028, dated June 7, 1864.

*To all whom it may concern:*

Be it known that I, FRANK HOWARD, of Somerville, in the county of Middlesex and State of Massachusetts, have invented an Improvement in the Manufacture of Ladies' Bonnets and Hats; and I hereby declare that the following is a full, clear, and exact description thereof.

The object of my improvement is to give an ornamental and lustrous appearance to the outside of bonnets and hats made of straw, cactus, chip, hair, and other material, so that they will have a more finished and attractive look, and are thereby rendered more salable; and my improvement consists in the application of a frosting of flint-glass, "smaltine," pulverized quartz, or other crystalline equivalent to the outer surface of the bonnet, over which the sizing has been laid.

To enable others skilled in the art to understand and apply my improvement, I will now proceed to describe the manner in which I have carried it out.

After the bonnet is pressed it is replaced on the block which has shaped it, and a waterproof sizing composed of white lac dissolved in spirits of wine, in the proportion of one-quarter of a pound of the former to one quart of the latter, is laid over the bonnet with a brush. This solution, being of a light transparent character, does not change the original color of the material of which the bonnet is made, and on account of the rapid evaporation of the spirits the shape of the bonnet is not injured. Immediately after using the sizing, and while it is still moist, I take the frosting of flint-glass or other substance before mentioned and sift it evenly over the exterior surface of the bonnet, which is then left on the block until dry, when it presents a beautiful and sparkling appearance.

Having thus fully described my invention, I would state that I am aware that a frosting of glass has been applied to the ornamentation of many things, and among these to the ornaments to be worn on a lady's bonnet; but

What I claim as a new article of manufacture is—

A lady's hat or bonnet frosted, substantially as and for the purpose described.

FRANK HOWARD.

Witnesses:
P. E. TESCHEMACHER,
N. W. STEARNS.